United States Patent  
Majzlik et al.

(10) Patent No.: US 9,910,175 B1  
(45) Date of Patent: Mar. 6, 2018

(54) MARINE SEISMIC SURVEY SYSTEM FOR GENERATING AND COLLECTING DATA AND FORMING A SEISMIC IMAGE

(71) Applicants: Edward Majzlik, Stafford, TX (US); Jesus Gaytan, Stafford, TX (US); Lawrence Scott, Stafford, TX (US)

(72) Inventors: Edward Majzlik, Stafford, TX (US); Jesus Gaytan, Stafford, TX (US); Lawrence Scott, Stafford, TX (US)

( * ) Notice: Subject to any disclaimer, the term of this patent is extended or adjusted under 35 U.S.C. 154(b) by 0 days.

(21) Appl. No.: 15/647,628

(22) Filed: Jul. 12, 2017

(51) Int. Cl.  
G01V 1/38 (2006.01)  
G01V 1/30 (2006.01)  
G01V 1/28 (2006.01)

(52) U.S. Cl.  
CPC .............. *G01V 1/30* (2013.01); *G01V 1/3808* (2013.01); *G01V 1/3817* (2013.01); *G01V 1/3843* (2013.01); *G01V 1/3861* (2013.01); *G01V 1/28* (2013.01); *G01V 1/38* (2013.01)

(58) Field of Classification Search  
CPC . G01V 1/38; G01V 1/3808; G01V 2210/1423  
USPC .................................................. 367/15–19  
See application file for complete search history.

(56) References Cited

U.S. PATENT DOCUMENTS

| 6,285,956 | B1 * | 9/2001 | Bennett | G01V 1/3808 367/16 |
|---|---|---|---|---|
| 8,351,293 | B2 * | 1/2013 | Frivik | G01V 1/38 181/110 |
| 8,792,298 | B2 * | 7/2014 | Toennessen | B63B 21/66 114/249 |
| 9,678,230 | B2 * | 6/2017 | Mandroux | G01V 1/02 |
| 2013/0039148 | A1 * | 2/2013 | Langeland | G01V 1/3861 367/16 |
| 2013/0114373 | A1 * | 5/2013 | Mandroux | G01V 1/02 367/16 |
| 2014/0078862 | A1 * | 3/2014 | Guevel | B63B 21/66 367/17 |
| 2014/0233350 | A1 * | 8/2014 | Stokkeland | G01V 1/3808 367/15 |
| 2014/0269169 | A1 * | 9/2014 | van Borselen | G01V 1/3861 367/15 |
| 2016/0139284 | A1 * | 5/2016 | Meech | G01V 1/3808 367/14 |
| 2017/0090053 | A1 * | 3/2017 | Eick | G01V 1/302 |
| 2017/0184749 | A1 * | 6/2017 | McKey, III | G01V 1/3826 |

* cited by examiner

*Primary Examiner* — Ian J Lobo  
(74) *Attorney, Agent, or Firm* — Buskop Law Group, P.C.; Wendy Buskop

(57) ABSTRACT

Method and apparatus for marine seismic data collection and high resolution imaging is described. A marine seismic surveying flotilla is described for acquiring seismic data from both beneath an obstruction and in unobstructed water using a configuration of floating energy source vessels and a floating acquisition vessel towing an array of parallel seismic streamers. Different energy sources can be disposed on or towed by floating vessels that are not the floating acquisition vessel, with these energy sources maintained at a preset radius from a center of the array of parallel seismic streamers.

16 Claims, 9 Drawing Sheets

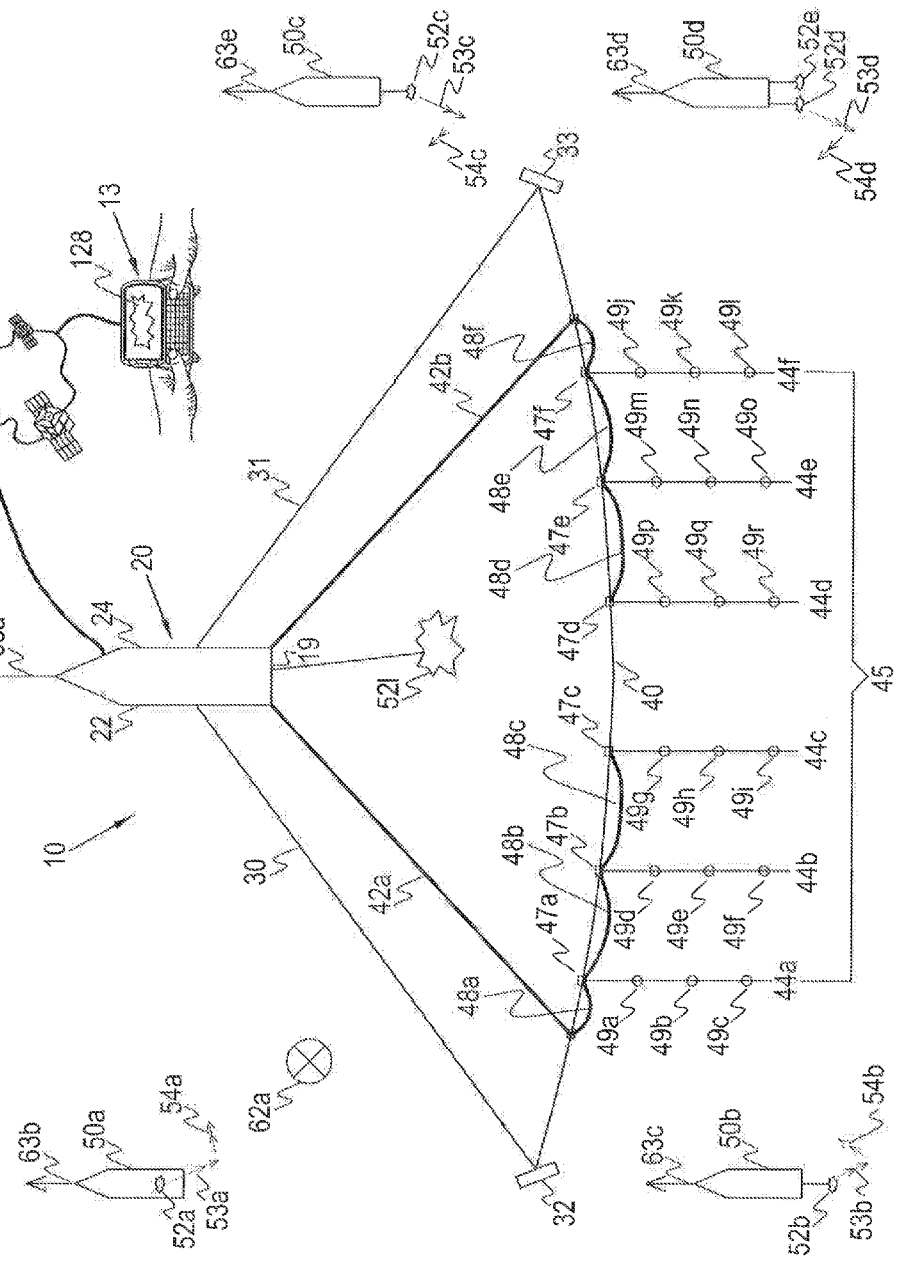

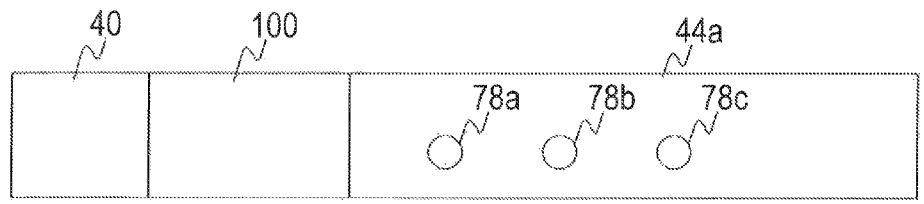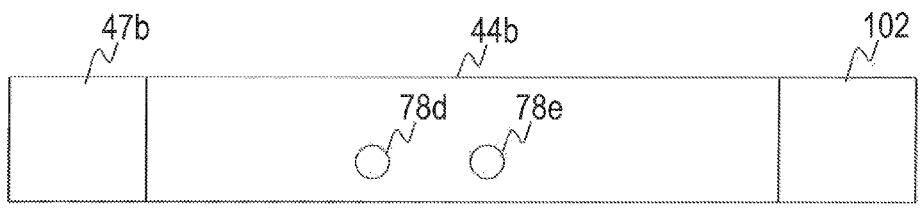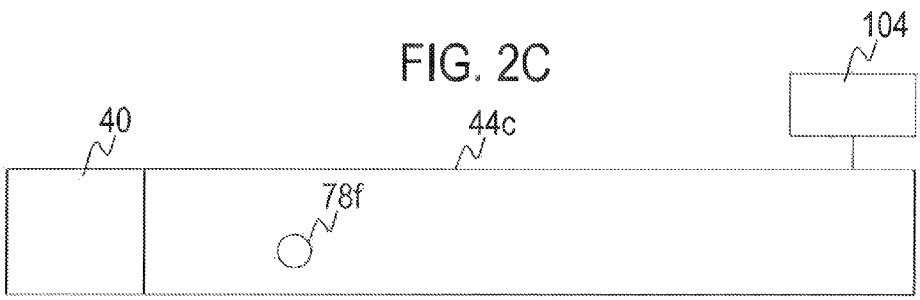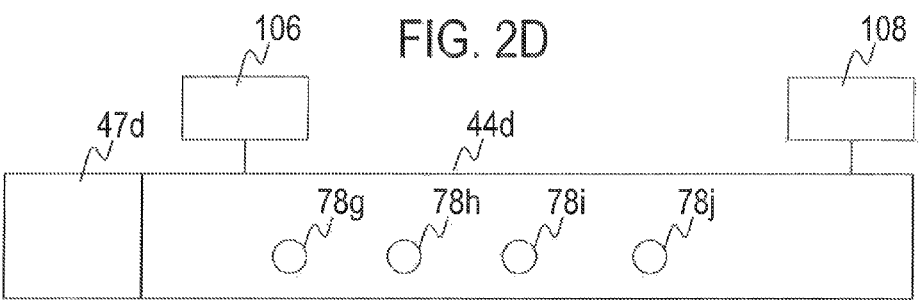

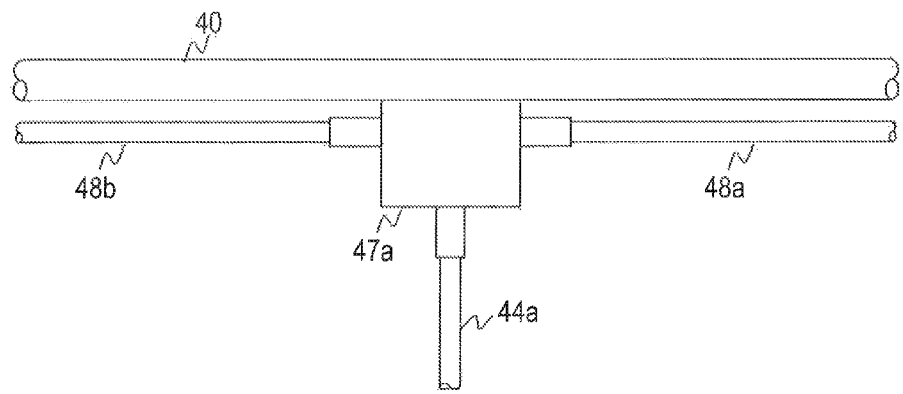
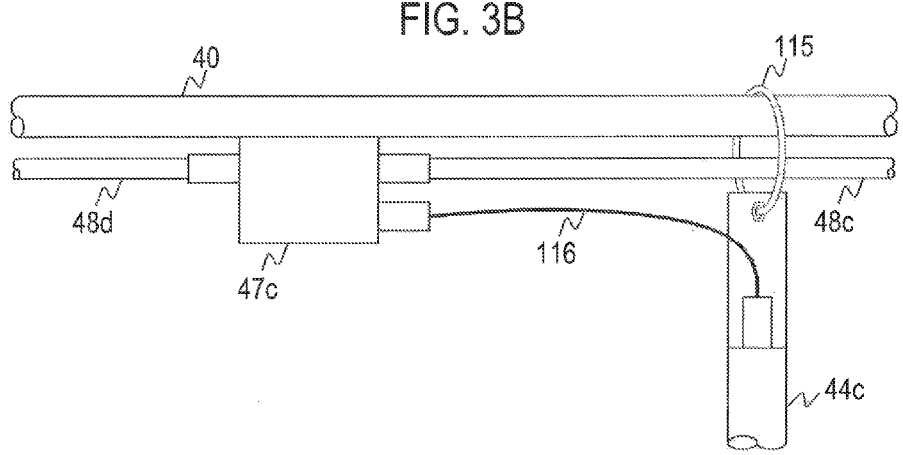

MARINE SEISMIC SURVEY SYSTEM FOR GENERATING AND COLLECTING DATA AND FORMING A SEISMIC IMAGE

FIELD

The present embodiments generally relate to methods and systems related to seismic exploration in a marine environment, and more particularly to mechanisms and techniques for providing seismic waves and collecting seismic data from a plurality of floating vessels in particular for use in providing a survey beneath an obstruction.

BACKGROUND

The present invention is related to marine seismic data acquisitions and processing, which generate a profile or image of a geological structure under the seafloor. The invention relates to a method of providing a high resolution image of structures under the sea floor.

The present embodiments meet these needs.

BRIEF DESCRIPTION OF THE DRAWINGS

The detailed description will be better understood in conjunction with the accompanying drawings as follows:

FIGS. 1A and 1B depicts embodiments of the marine seismic surveying flotilla according to one or more embodiments.

FIGS. 2A-2D depict a seismic streamer attached to an arced cable or watertight junction box according to one or more embodiments.

FIGS. 3A and 3B depict a detail of watertight junction boxes connected to seismic streamers and arced cables according to one or more embodiments.

Figure 1B:
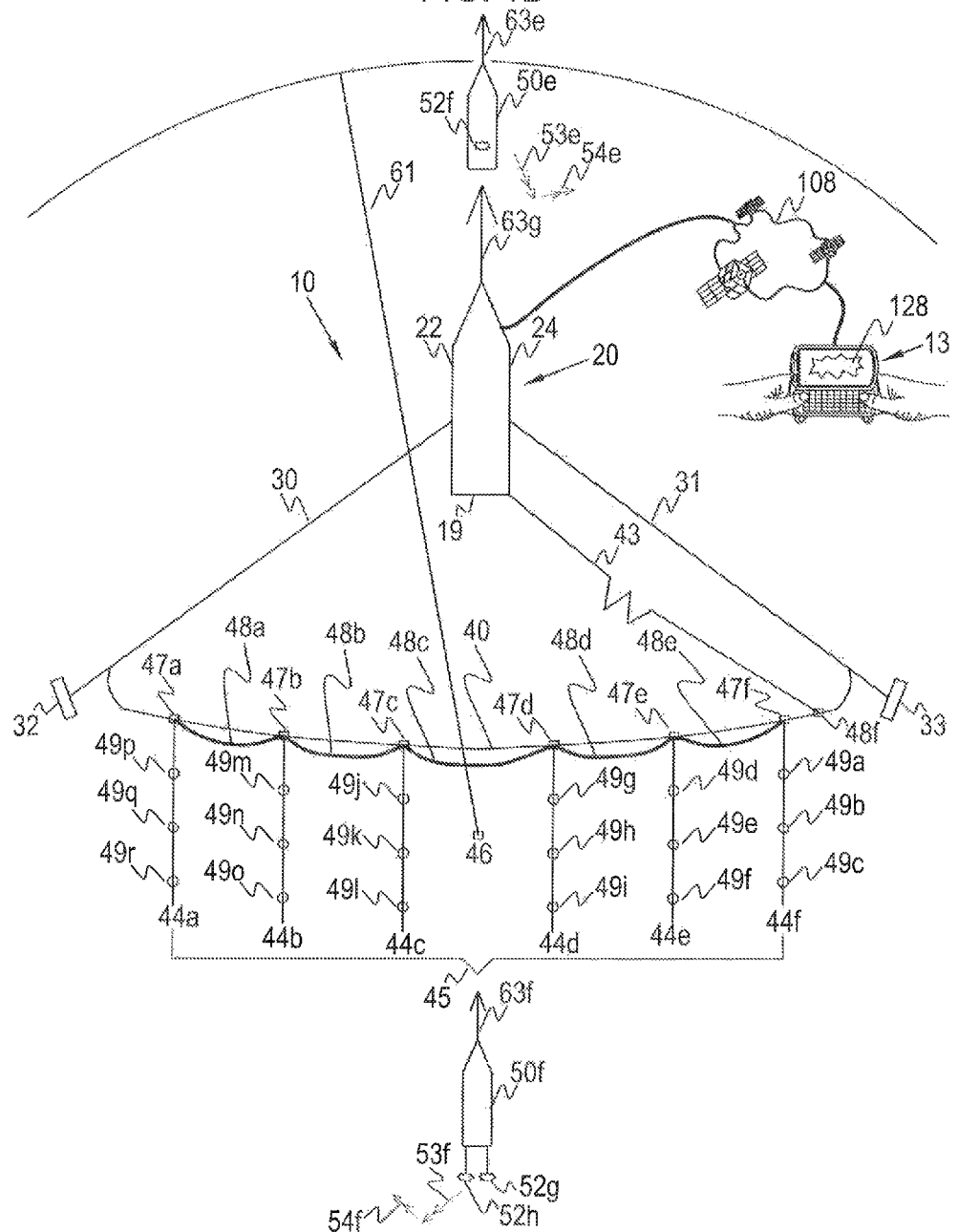

The present embodiments are detailed below with reference to the listed Figures.

SUMMARY OF THE INVENTION

A marine flotilla for marine seismic data collection and high resolution seismic imaging is described.

A marine seismic surveying flotilla acquires seismic data from both beneath an obstruction and in unobstructed water using a configuration of floating energy source vessels and a floating acquisition vessel towing an array of seismic streamers.

Different energy sources can be disposed on or towed by independent energy source floating vessels which are not the floating acquisition vessel.

These energy sources are maintained at a preset radius from a center of the array of seismic streamers and pulsed providing reflected energy pulses to a floating acquisition vessel towing the array enabling detailed seismic data to be obtained from beneath an obstruction at sea.

DETAILED DESCRIPTION OF THE EMBODIMENTS

Before explaining the present marine flotilla for seismic gathering and imaging in detail, it is to be understood that the marine flotilla is not limited to the particular embodiments and that it can be assembled and operated in various ways.

Specific structural and functional details disclosed herein are not to be interpreted as limiting, but merely as a basis of the claims and as a representative basis for teaching persons having ordinary skill in the art to variously employ the present invention.

The invention relates to a flotilla of vessels, which may be comprised of one acquisition floating vessel and at least one independent energy source floating vessel.

The acquisition floating vessel may range in length from 10 meters to over 100 meters. The acquisition floating vessel may be a purpose-built seismic research vessel, a platform supply vessel, or any vessel of opportunity capable of carrying and deploying the high resolution seismic spread.

The independent energy source floating vessels may range in length from 5 meters to over 100 meters. The independent energy source floating vessels may be purpose-built seismic research vessels, platform supply vessels, an autonomous or unmanned surface vessel, or any other vessel of opportunity capable of carrying and deploying an energy source.

The flotilla will operate in a coordinated manner to acquire high-resolution seismic data to achieve the geophysical objectives specified by the client. In a typical survey, the flotilla may operate within a prospect area in excess of 100 km2. During the operation the flotilla may encounter marine hazards such as floating debris, third-party vessels, water currents in excess of 3 knots, and sea states in excess of force 6 on the Beaufort Wind Scale.

Mapping subsurface geology during exploration for oil and gas, other minerals and fluids involves a form of remote sensing and the construct of three dimensional images of the subsurface.

Difficulties at sea evolve when obstructions, such as abandoned platforms, or existing production platforms that are working block smooth and easy seismic measurement.

The embodiments involve methods and equipment, wherein a flotilla is used to obtain seismic information from beneath an obstruction.

The embodiments have a seismic source and acquisition vessel that tows through a harness, and an array of seismic streamers connected to the vessel by a single communication cable.

In embodiments, a plurality of secondary floating vessels either tows an energy source or emits an energy source from their vessel. The secondary floating vessels are kept either ahead of the vessel with the array of seismic streamers or are tangent to the vessel with the seismic streamers.

The energy source transmits pressure pulses into the earth, which are reflected by geological interfaces in the earth and subsequently detected by the array of seismic streamers and then transmitted by receivers to a primary processor. Such surveys can be done with hydrophones in a marine environment which detect pressure changes due to the reflected wave-field and induce an electrical signal that may be recorded.

In a marine environment, the energy transmits to the sea floor and subsurface through the water. Both the energy source and the hydrophones lie within the water layer to transmit and detect the emitted and the reflected energy.

Obstacles rising from the sea floor, such as sunken vessels or unused platforms cause problems in processing and in interpreting the sub-surface data. Complete reflections of the subsurface interfaces are impossible by traditional seismic methods.

The following terms are used herein:

The term "acoustic buoy" refers to a surface buoy equipped with an acoustic transceiver, which is used to measure ranges to other acoustic transceivers located within the streamer array.

The term "acquisition floating vessel" refers to a surface ship equipped with a high resolution marine seismic acquisition system and crew.

The term "arced cable" refers to one or more sections of high-strength steel or synthetic fiber rope connected in a linear fashion and spread between a pair of tow lines that is used to tow the streamers.

The term "array of streamers" refers to the collection of seismic streamers towed either directly or indirectly by the arced cable.

The term "energy pulse" refers to the seismic energy emitted from the energy source, which travels from the energy source into the surrounding water and through the underlying strata of the Earth.

The term "energy source" refers to a device for generating the desired energy pulse. This device may be comprised of one or more boomer, bubble gun, sparker, or airgun systems. An example of a boomer is the S-Boom manufactured by Applied Acoustics Engineering Ltd of Greater Yarmouth, United Kingdom. An example of a bubble gun is the HMS-620 Bubble Gun manufactured by Falmouth Scientific, Inc. of Cataumet, Mass. An example of a sparker is the Dura-Spark 400 manufactured by Applied Acoustics Engineering Ltd of Greater Yarmouth, United Kingdom. An example of an airgun is the 1900LLX-T manufactured by Teledyne Bolt of Houston, Tex.

The term "global positioning system buoy" refers to a surface buoy equipped with a global positioning system, which is used to locate a point on the streamer within a coordinate system.

The term "head stretch section" refers to a section of the streamer located at the forward end of the streamer, which is used to reduce shock loading and vibration on the streamer created while towing the streamer through the water.

The term "high resolution seismic image" refers to a horizontal bin size less than 6.25 meters with a temporal sampling interval of 1 millisecond or less.

The term "independent energy source vessel" refers to a manned or unmanned, surface or subsurface vehicle equipped with an energy source, which is free to move independently of the acquisition floating vessel as part of the marine seismic surveying flotilla.

The term "interconnect cable" refers to a cable used to carry electrical power, control, and data signals between adjacent watertight junction boxes or between a watertight junction box and a lead in cable.

The term "lead in connection" refers to a high-strength steel or synthetic fiber reinforced cable used to carry electrical power, control, and data signals between the acquisition floating vessel and a group of streamers or a wireless connection.

The term "marine seismic surveying flotilla" refers to a collection of acquisition floating vessels and independent energy source floating vessels operating in conjunction with each other in order to produce a dataset of seismic data.

The term "preset bin size" refers to the spatial dimensions of the horizontal pixel size of the seismic image, such as a boxel, which is less than 6.25 meters.

The term "preset sampling interval" refers to a time interval between successive digital samples in the recording system, which are less than or equal to 1 millisecond.

The term "receiver" refers to device used to convert seismic energy into electrical signals through the use of pressure or particle acceleration sensing instruments.

The term "reflected energy pulse" refers to the seismic energy from the energy pulse that is reflected towards a receiver from the underlying strata of the Earth due to changes in the impedance of those strata.

The term "seismic streamer" refers to a device equipped with a plurality of integral receivers, which is used to maintain the receivers at regular intervals longitudinally, maintain the receivers at the desired depth, provide power to the receivers and transmit control and data signals between the watertight junction boxes and the receivers.

The term "subsurface geographic location" refers to an area for seismic surveying, which can not only be defined by latitude and longitude and elevation but also equivalent X, Y, and Z coordinates in a projected reference frame.

The term "tail buoy" refers to a surface buoy towed by the rear end of the streamer which is used to support the rear end of the streamer at and desired depth and may be equipped with acoustic transceivers and global positioning systems for the purpose of locating a point on the streamer with a coordinate system.

The term "tail stretch section" refers to a section of the streamer located at the rear end of the streamer which is used to reduce shock loading and vibration caused by a tail buoy on the streamer.

The term "tow line" refers to a high-strength steel or synthetic fiber rope used to connect a towing vessel to the towed diverters.

The term "watertight junction box" refers to a device that allows the electrical connection between a streamer and one or more interconnect cables. The watertight junction box may also provide a mechanical connection between the streamer and the arced cable.

This embodiments will allow oil platform operators to rapidly obtain high-resolution seismic images of the Earth directly below existing oil platforms. This data may be obtained in a time-lapse fashion over a period of days or years to monitor the changing geologic conditions that may be occurring due to hydrocarbon recovery or natural processes.

The undershooting technique that will be utilized by the embodiments will allow survey vessels to remain further away from oil platforms while still imaging underneath the oil platforms than single vessel imaging techniques. This will reduce the risk of collision between the survey vessels and the oil platform.

The embodiments will allow smaller vessels equipped with energy sources only to increase the effective swath width of data normally recorded by a single high resolution survey vessel alone. This will decrease the amount of energy (vessel's fuel consumption) required to execute the seismic survey when compared to survey crew comprised of a single larger vessel.

The use of additional source vessel to increase the effective swath width of the survey crew will lead to increased productivity rates and therefore, shorten the total duration of the survey. This will result in less overall HSE exposure in regard to total number of days in the field. The use of smaller or unmanned vessels as the additional source vessels will also lead to a reduced number of personnel on the crew when compared to larger, manned vessels, which will serve to lower the overall exposure hours for the survey.

Producing rapid, high resolution images below existing oil platforms will increase the information available to the operator. This information may result in increased hydrocarbon recovery from existing assets, which may extend the overall service life of those assets and reduce the need to construct new oil platforms or develop new oil fields.

The following parameters of the seismic source and receiver system for the invention can be as followed:

The number of streamers in the receiver system can range from 3 to 36.

The number of lead in cables in the receiver system can be less than the number of streamers, with a least one lead in cable per every three streamers.

The length of any streamer may range from 12 meters to 400 meters.

The separation between adjacent, seismic streamers can be between 3 meters to 25 meters.

The range of frequencies produced by a seismic source can be between 2 Hz to 5,000 Hz.

Turning now to the Figures, FIGS. 1A and 1B show two different embodiments of the marine seismic surveying flotilla 10 that is particularly useful for creating a complete seismic survey in obstructed waters.

The marine seismic surveying flotilla 10 has an acquisition floating vessel 20. In embodiments, the acquisition floating vessel 20 may not have an energy source. In this embodiment, of FIG. 1A the acquisition floating vessel is towing an energy source 52*l*.

In embodiments, the floating acquisition vessel has a port side 22 and a starboard side 24 and a stem 19. The floating acquisition vessel 20 is headed in a first direction 63a. In FIG. 1B, the floating acquisition vessel 20 is headed in a second direction 63g.

In embodiments, the floating acquisition vessel 20 is in communication with a network 108 for communication with a client device 13. The client device 13 is depicted as a cell phone that is displaying a high resolution seismic image 128 produced by the marine seismic surveying flotilla 10.

In embodiments, the client device can be a laptop computer.

In FIG. 1A, the marine seismic surveying flotilla 10 is collecting reflected energy pulses 54a-54d from beneath an obstruction 62a.

In FIG. 1B, the marine seismic surveying flotilla 10 is collecting reflected energy pulses 54e and 54f from a geographic area without an obstruction.

In embodiments, a port side tow line 30 is shown connecting to the port side 22 of the hull of the acquisition floating vessel 20.

In other embodiments, the port side tow line 30 can connect to a port portion of the stern 19 of the acquisition floating vessel 20.

In embodiments, a starboard side tow line 31 is depicted as connecting to the starboard side 24 of the hull of the acquisition floating vessel 20.

In other embodiments, the starboard side tow line 31 can connect to a starboard portion of the stem 19 of the acquisition floating vessel 20.

An arced cable 40 is shown connecting between the port side tow line 30 and the starboard side tow line 31.

Two lead in connections are used in FIG. 1A. A first lead in connection 42a and second lead in connection 42b are shown electrically connecting the acquisition floating vessel 20 to at least one end of a plurality of connected interconnect cables 48a-48f.

One wireless lead in connection 43 is used in FIG. 1B. The wireless lead in connection 43 is shown with a connection of the electromagnetic spectrum to the acquisition floating vessel 20 and to at least one end of a plurality of connected interconnect cables 48a-48f.

A plurality of seismic streamers 44a-44f is depicted for towing below a surface of water as an array of seismic streamers 45.

The array of seismic streamers 45 is electrically connected to both of the lead in connections 42a and 42b in FIG. 1A as well as mechanically connected to the arced cable 40.

The array of seismic streamers 45 of FIG. 1B is shown having a center 46, which is important to the embodiments.

A plurality of watertight junction boxes 47a-47f mechanically connects to the arced cable 40.

Each seismic streamer 44a-44f electrically connects to one of the watertight junction boxes 47a-47f.

A plurality of interconnect cables 48a-48f are used to electrically connect seismic streamers 44a-44f to the lead in connections 42a, 42b, or 43 depending on whether the wired embodiment of FIG. 1A or wireless embodiment of FIG. 1B is used.

Each interconnect cable connects together a pair of watertight junction boxes 47a-47f, such as interconnect cable 48b connects together watertight junction boxes 47a-47f.

One of the interconnect cables 48f electronically connects the connected watertight junction boxes to the lead in connection 42b in FIG. 1A.

A plurality of receivers 49a-49r are used in the invention to receive reflected energy pulses, reflected from earth and geological layers beneath the earth's surface, including the earth beneath an obstruction.

At least one receiver is positioned on each of the plurality of seismic streamers.

Three receivers per seismic streamer are depicted in FIG. 1A.

In embodiments, one seismic streamer may have a different number of receivers than another seismic streamer.

At least one independent energy source floating vessel 50a having an energy source 52a travels in parallel with the acquisition floating vessel 20.

In embodiments shown in FIG. 1A, four independent energy source floating vessels are used, 50a-50d.

Each independent energy source floating vessel is located within a preset radius 61 from the center 46 of the array of seismic streamers 45, which is shown in FIG. 1B.

Each preset radius 61 is defined for each independent energy source floating vessel. In embodiments, there can be one preset radius which contains all the vessels.

In embodiments, each independent energy source floating vessel 50a, 50b, 50c and 50d moves in substantially parallel direction of travel to the acquisition floating vessel 20. The direction of travel is shown as 63b for vessel 50a, 63c for vessel 52b, 63e for vessel 50c and direction of travel 63d for vessel 50d.

A plurality of energy sources from the independent energy source floating vessels provide energy pulses. An energy source can be positioned on one or more of the independent energy source floating vessels. An energy source can be towed by one of the independent energy source floating vessels.

In embodiments, one of the independent energy source floating vessels can have a plurality of energy sources, each energy source is capable of providing energy pulses that enable the acquisition floating vessel 20 to receive a plurality of reflected energy pulses using the plurality of receivers on the plurality of seismic streamers.

The independent energy source floating vessel 50a has an energy source 52a on board, which generates energy pulses 53a that when connecting with the earth form reflected energy pulses 54a as shown in FIG. 1A.

The independent energy source floating vessel 50b tows energy source 52b, which generates energy pulses 53b that when connecting with the earth forming reflected energy pulse 54b as shown in FIG. 1A.

The independent energy source floating vessel 50c tows energy source 52c, which generates energy pulses 53c that when connecting with the earth forming reflected energy pulse 54c as shown in FIG. 1A.

The independent energy source floating vessel 50d has energy sources 52d and 52e. Only energy source 52d generates energy pulse 53d that when connecting with the earth forms reflected energy pulse 54d as shown in FIG. 1A.

FIG. 1B shows the floating acquisition vessel 20 having no energy source.

The independent energy source floating vessel 50e moves in direction 63e parallel to the direction 63g of the floating acquisition vessel 20 as shown in FIG. 1B.

In embodiments, the independent energy source floating vessel 50e with an onboard energy source 52f that generates energy pulses 53e that reflect with the earth forming reflected energy pulse 54e as shown in FIG. 1B.

An independent energy source floating vessel 50f moving in direction 63f and towing two energy sources 52g and 52h as shown in FIG. 1B. Each energy source can generate energy pulses, but only one is generating energy pulses 53f. Energy pulses 53f connect with the earth and form reflected energy pulse 54f.

The client device 13 with a processor 60 (shown in FIG. 8) and a display 68 provides bidirectional communication via the network.

The network can be a global communication network, a wide area network, a local area network, a satellite network, a fiber optic network, or combinations thereof.

The client device 13 receives reflected energy pulses, and maps the reflected energy pulses to a subsurface geographic location 110 (shown in FIG. 8) using a seismic velocity model 112 (shown in FIG. 8) to migrate reflected energy pulses acquired by the plurality of receivers and produce a high resolution seismic image 128 with a preset bin size and preset sampling interval.

The marine seismic surveying flotilla is shown having a port side diverter 32 connected to the port side tow line 30 and a starboard side diverter 33 connected to the starboard side tow line 31.

The arced cable 40 is connected between the port side diverter 32 and the starboard side diverter 33 as shown in FIG. 1A; whereas, FIG. 1B depicts no connection of either diverter 32 or 33 to the arced cable 40.

Other elements in FIG. 1B mirror FIG. 1A including the tow lines 30 and 31, the arced cable 40, the plurality of seismic streamers 44a-44f, the plurality of receivers 49a-49r, the plurality of watertight junction boxes 47a-47f, and the plurality of interconnect cables 48a-48f.

FIGS. 2A through 2D show four different embodiments of a seismic streamer usable herein.

FIG. 2A shows the seismic streamer 44a with a head stretch section 100.

The head stretch section 100 is connected to the arced cable 40.

A plurality of sensors 78a-78c are embedded in the seismic streamer which in this embodiment can be pressure sensors.

FIG. 2B shows a seismic streamer 44b with a tail stretch section 102.

The seismic streamer 44b is connected to a watertight junction box 47b.

Sensors 78d and 78e are depicted embedded in the seismic streamer 44b, which all can be accelerometers.

FIG. 2C shows the seismic streamer 44c with an acoustic buoy 104.

The seismic streamer 44c is connected to an arced cable 40 and has one sensor 78f. The sensor 78f can be a three axis accelerometer.

FIG. 2D shows the seismic streamer 44d with a global positioning system buoy 106, and a tail buoy 108.

The seismic streamer 44d is connected to a watertight junction box 47d. The seismic streamer 44d has four different sensors, including magnetic, electromagnetic, chemical, and velocity sensors 78g-78j.

FIG. 3A shows a seismic streamer 44a connecting mechanically and electrically to one of the plurality of watertight junction boxes 47a.

The watertight junction box 47a is connected electrically between interconnect cables 48a and 48b.

The watertight junction box 47a is affixed to the arced cable 40.

FIG. 3B shows the seismic streamer 44c connecting mechanically to the arced cable 40 with a fastener 115. In embodiments, the fastener can be a shackle.

The seismic streamer 44c is electrically connected to the watertight junction box 47c with an electrical streamer jumper 116.

The watertight junction box 47c is shown affixed to the arced cable 40 and electrically connected between interconnect cables 48c and 48d. The fastener 115 can be a wire connector or as another example, a pair of zip ties.

Figure 4:
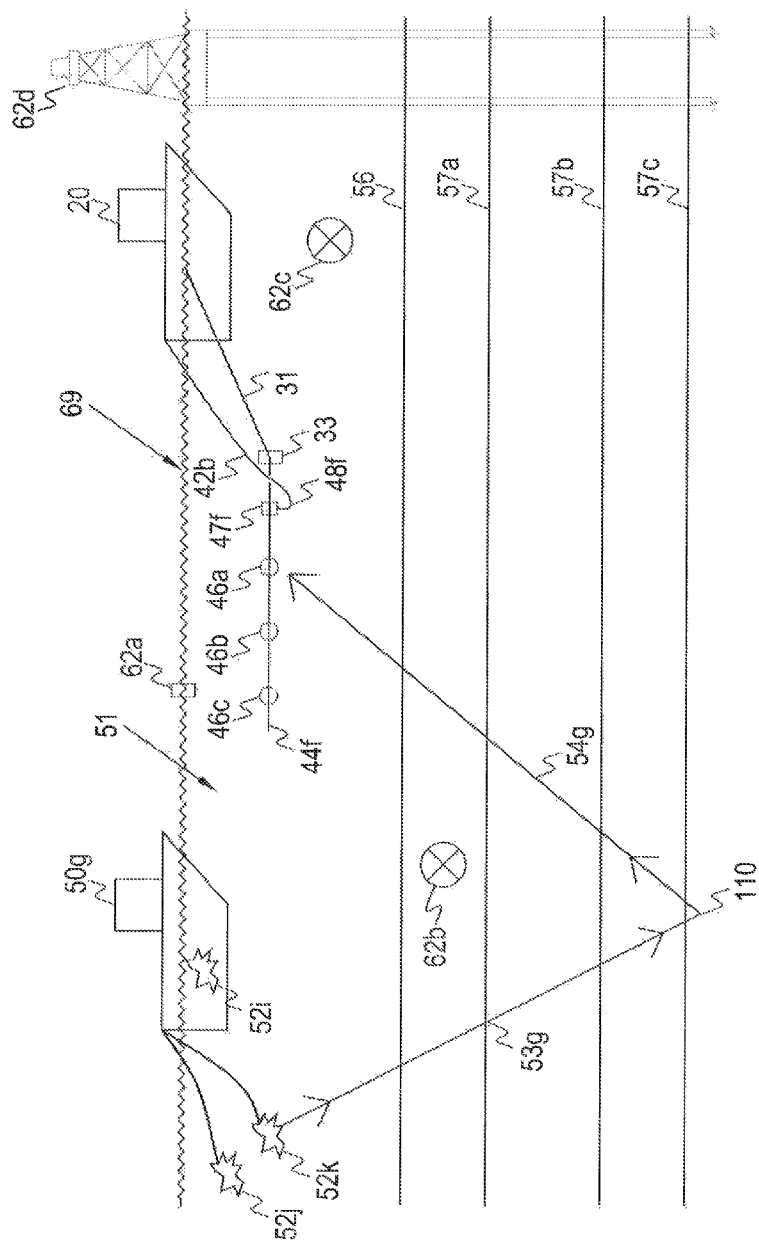
FIG. 4 is a detail of reflected energy pulses as collected by an array of seismic streamers according to one or more embodiments.

FIG. 4 shows the reflected energy pulse 54g that is used to form the high resolution seismic image 128 (shown in FIG. 1A) from beneath an obstruction either (i) on the sea floor 56 shown as obstruction 62d, (ii) beneath the sea floor shown as obstruction 62b; (iii) proximate the sea floor shown as obstruction 62c, or (iv) proximate the sea surface 69 shown as obstruction 62a which obstruction can be slightly below the sea surface 69 or above the sea surface 69.

The reflected energy pulses result from the energy source 52k but not from energy source 52j.

The energy pulse 53g reflects off of a subsurface geographic location 110 as reflected energy pulse 54g.

The energy sources are towed behind an independent energy source floating vessel 50g that additionally has an onboard energy source 52i.

The reflected energy pulse 54g is captured by the receivers 46a-46c positioned on the seismic streamer 44f, which is attached to the acquisition floating vessel 20 via starboard side tow line 31 with lead in connection 42b that engages a watertight junction box 47f via interconnect cable 48f. The starboard side diverter 33 is also shown.

In embodiments, the energy source 52k transmits energy pulses 53g through the water 51 which maybe reflected by geological interfaces 57-57c beneath the sea floor 56 and subsequently collected by the plurality of receivers on the plurality of seismic streamers as depicted in FIGS. 1A and 1B.

Figure 5A:
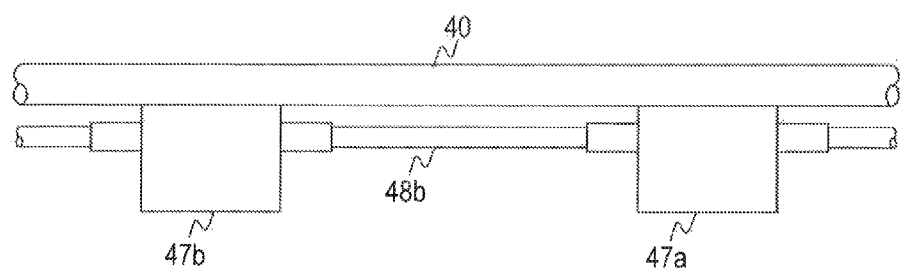
FIGS. 5A and 5B depict different orientations of interconnect cables according to one or more embodiments.

FIG. 5A shows a pair of watertight junction boxes 47a and 47b. Each watertight junction box is affixed to the arced cable 40. An interconnect cable 48b connects between the pair of watertight junction boxes in parallel to the arced cable 40.

Figure 5B:
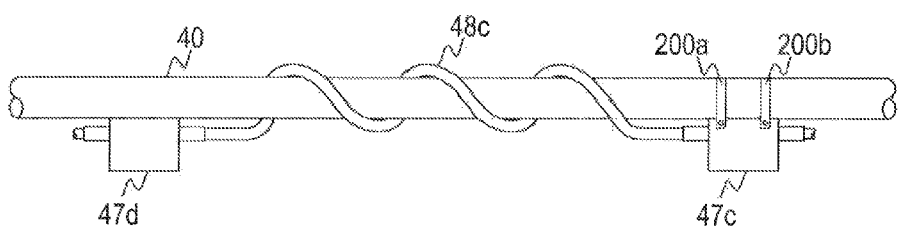

FIG. 5B shows a pair of watertight junction boxes 47c and 47d. Each watertight junction boxes 47c and 47d is affixed to the arced cable 40. An interconnect cable 48c is wound around the arced cable 40 connecting between the two watertight junction boxes 47c and 47d. A pair of mechanical fasteners 200a and 200b can be used to attach each watertight junction box to the arced cable.

Figure 6:
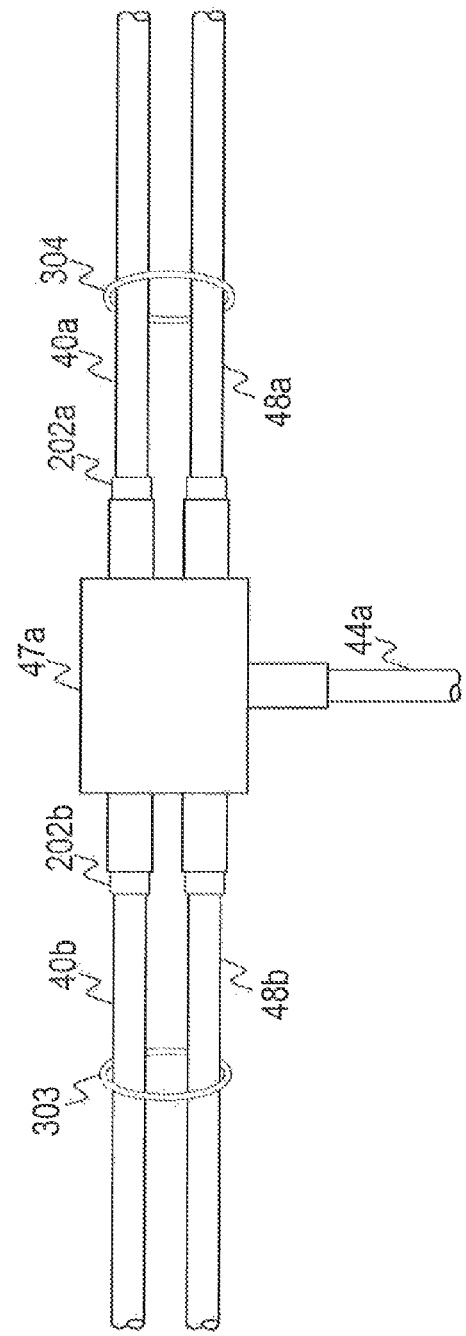
FIG. 6 depicts an embodiment of connections to one of the watertight junction boxes according to one or more embodiments.

FIG. 6 shows an embodiment wherein the watertight junction box 47a connects to two segments of arced cable 40a and 40b. The water tight junction box 47a connects to two of the interconnect cables 48a and 48b.

Arced cable and interconnect cables can be coupled together with one or more flexible fasteners 303 such as zip ties or tape, rigid fasteners 304 such as clamps, or combinations thereof.

The watertight junction box 47a supports a seismic streamer 44a. Mechanical connections 202a and 202b, which can be threaded fasteners or links, can be used to connect to two arced cable segments 40a and 40b and transfer torque and load from the watertight junction box 47a to the arced cable segments 40a and 40b.

Figure 7:
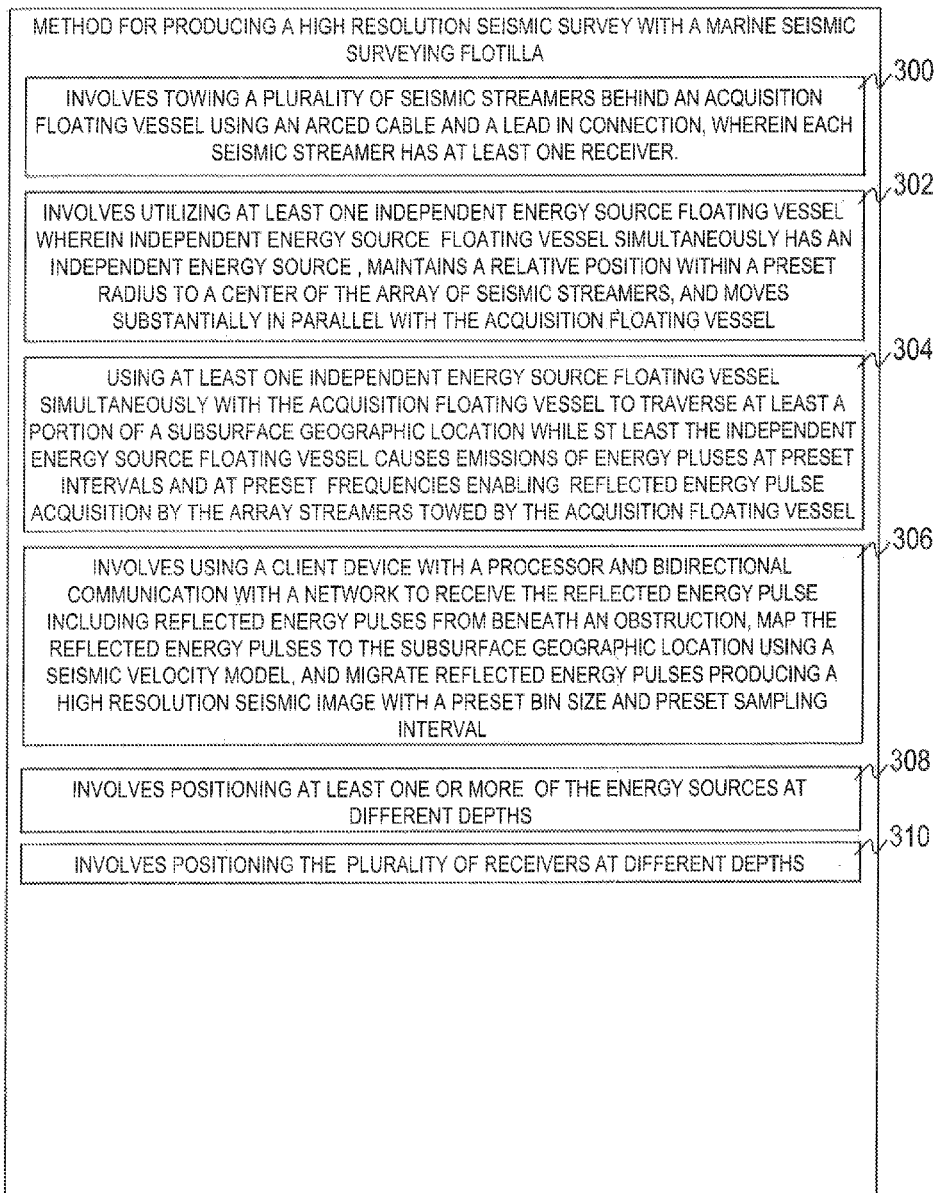
FIG. 7 depicts steps of a method for surveying using the marine seismic surveying flotilla according to one or more embodiments.

FIG. 7 is a diagram of a method using a marine seismic surveying flotilla for producing a high resolution seismic survey according to one or more embodiments.

The method for using a marine seismic surveying flotilla for producing a high resolution seismic survey can include, but is not limited to the steps described below. The method can be utilized by a person of ordinary skill in the industry, and is not limited to a particular order or sequence.

The method involves towing an array of seismic streamers behind an acquisition floating vessel using an arced cable and a lead in connection, wherein each seismic streamer in the array of seismic streamers has at least one receiver and fewer lead in connections than seismic streamers as shown box 300.

The method involves utilizing at least one independent energy source floating vessel, wherein each independent energy source floating vessel simultaneously (i) has an independent energy source, (ii) maintains a relative position within a preset radius to a center of the array of seismic streamers, and (iii) moves substantially in parallel with the acquisition floating vessel box 302.

The method involves using at least one independent energy source floating vessel simultaneously with the acquisition floating vessel to traverse at least a portion of a subsurface geographic location while at least the independent energy source floating vessel causes emissions of energy pulses at preset intervals and at preset frequencies enabling reflected energy pulse acquisition by the array of seismic streamers towed by the acquisition floating vessel as shown in box 304.

The method involves using a client device with a processor and bidirectional communication with a network to (i) receive the reflected energy pulses including reflected energy pulses from beneath an obstruction, (ii) map the reflected energy pulses to the subsurface geographic location using a seismic velocity model, and (iii) migrate reflected energy pulses producing a high resolution seismic image with a preset bin size and preset sampling interval as shown in box 306.

The method involves positioning at least one or more of the energy sources at different depths as shown in box 308.

The method involves positioning the plurality of receivers at different depths as shown in box 310.

Figure 8:
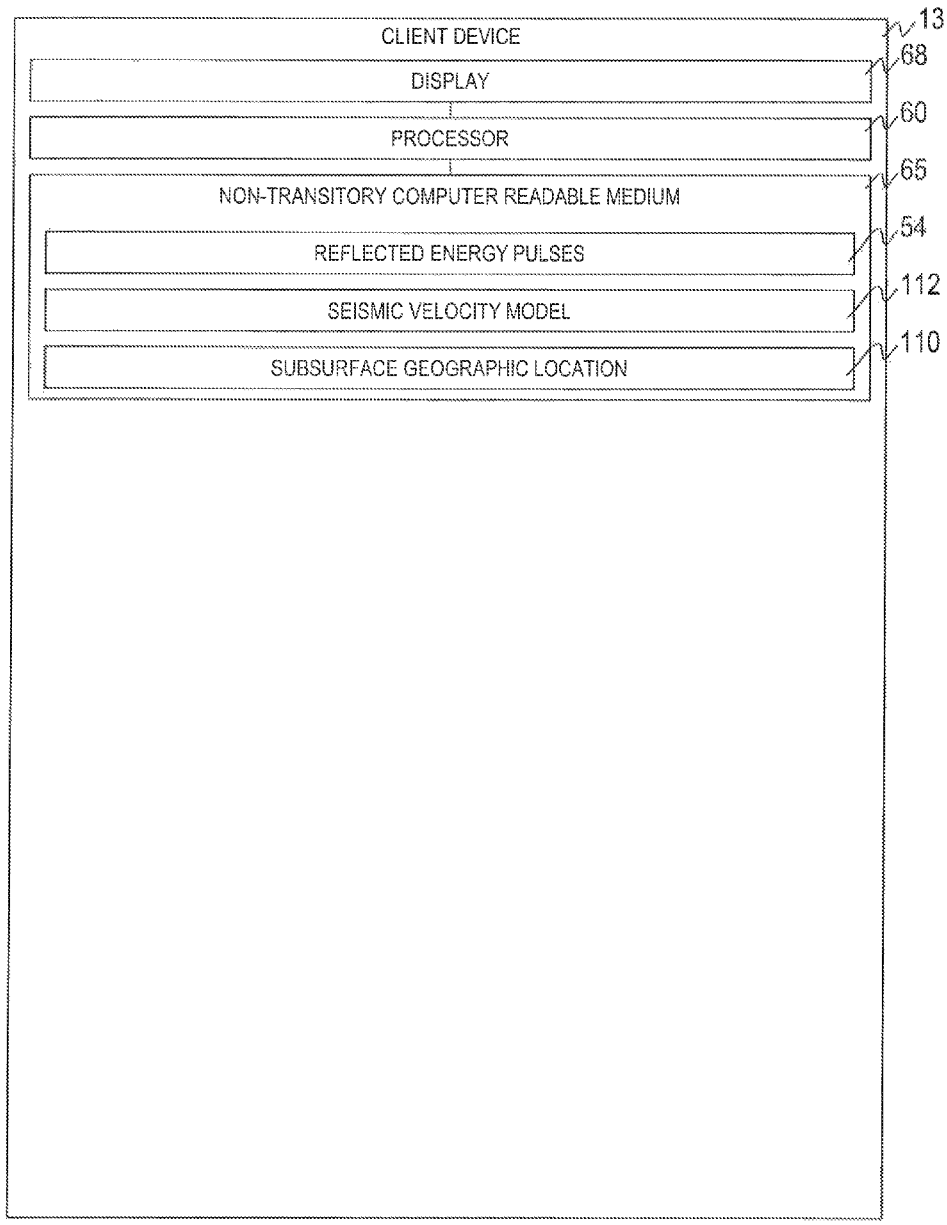
FIG. 8 depicts a client device for presenting the high resolution seismic image created using the flotilla according to one or more embodiments.

FIG. 8 depicts a client device 13 with a processor 60, a non-transitory computer readable medium 65, and a display 68 for receiving the reflected energy pulses 54.

The non-transitory computer readable medium 65 also stores the seismic velocity model 112 along with the reflected energy pulses 54 and subsurface geographic location 110.

In embodiments, the marine seismic surveying flotilla has a preset radius that is from 10 meters to 5000 meters from the center of the array of seismic streamers.

In embodiments, the marine seismic surveying flotilla uses from 2 receivers to 128 receivers positioned on each of the plurality of seismic streamers.

In embodiments, the marine seismic surveying flotilla has seismic streamers wherein each has a length from 12 meters to 400 meters.

In embodiments, the marine seismic surveying flotilla has seismic streamers in a wired connection, a wireless connection, or combinations of wired and wireless connections, to the acquisition floating vessel.

In embodiments of the marine seismic surveying flotilla, each seismic streamer has each receiver contained within a seismic streamer forming an integral unit.

In embodiments, each receiver has at least one sensor selected from the group: a pressure sensor, an acceleration sensor, electromagnetic sensor, magnetic sensor, velocity sensor, and combinations thereof.

The embodiments can have at least one of the plurality of energy sources either onboard, towed or both onboard and towed.

In embodiments of the marine seismic surveying flotilla, the plurality of watertight junction boxes are each affixed to the arced cable with each interconnect cable connected parallel to the arced cable.

In embodiments, the marine seismic surveying flotilla can have the plurality of watertight junction boxes each affixed to an arced cable with each interconnect cables wound around the arced cable.

In embodiments, the marine seismic surveying flotilla can have each watertight junction box connecting to two separate segments of arced cable, and each water tight junction box connecting between two separate interconnect cables and one of the seismic streamers

EXAMPLES

Example One

A marine seismic surveying flotilla 10 having an acquisition floating vessel 20 that is a 200 foot long seismic research vessel.

A port side tow line 30 made from synthetic fiber rope with a 1 inch diameter connected to a port side 22 of a hull of the acquisition floating vessel.

A starboard side tow line 31 made from synthetic fiber rope with a 1 inch diameter connected to a starboard side 24 of the hull of the acquisition floating vessel.

An arced cable 40 made from synthetic rope 1 inch in diameter, having a length of 250 meters is connected between the port side tow line 30 and the starboard side tow line 31.

A wired lead in connection 42 connected between the arced cable 40 and the acquisition floating vessel. The lead in is 150 meters long in this example. The lead in in this wired version is made from high strength steel reinforced cable with a diameter of 1 inch configured to carry data and electrical power.

16 seismic streamers for towing below 3 meters of water as an array of seismic streamers electrically connect to the lead in connection and mechanically connected to the arced cable.

The array of seismic streamers has a center that is the geometric center of the array, in this example, halfway between seismic streamers 8 and 9 as the array of seismic streamers are towed by the acquisition floating vessel.

16 watertight junction boxes mechanically connected to the arced cable 40.

Each seismic streamer is electrically connected to one of the watertight junction boxes and mechanically connected to the arced cable with fasteners.

A plurality of interconnect cables are used. Each of the interconnect cable connects together pairs of watertight junction boxes and can be up 15 meters long.

An interconnect cable electronically connects the connected watertight junction boxes to the lead in connection.

Each of the 16 streamers has 16 receivers.

One independent energy source floating vessel is located within a preset radius that is no larger than 2000 meters from the center of the array of seismic streamers.

The independent energy source floating vessel can be 150 foot long platform supply vessel moving in substantially parallel direction of travel using the same magnetic compass bearing as the acquisition floating vessel, such as 45 degrees from magnetic north.

One energy source is being towed by the independent energy source floating vessel.

The energy source is an array of airguns that provide energy pulses with a frequency ranging from 2 Hz to 1000 Hz during use.

The energy pulses 53 enable the acquisition floating vessel 20 to receive a plurality of reflected energy pulses 54 using the plurality of seismic streamers.

The reflected energy pulses have the same frequency as the airguns.

A client device such as a computer with a processor and bidirectional communication with a network receives the reflected energy pulses.

The computer then maps the reflected energy pulses to a subsurface geographic location using a seismic velocity model stored in the non-transitory computer readable media of the computer to migrate reflected energy pulses and produce a high resolution a seismic image.

Example Two

A marine seismic surveying flotilla 10 having an acquisition floating vessel 20 that is a 300 foot long platform supply vessel.

A port side tow line 30 made from synthetic fiber rope with a 1 inch diameter connected to either a port side 24 of the stern of the acquisition floating vessel.

A starboard side tow line 31 made from synthetic fiber rope with a 1 inch diameter connected to either a starboard side 25 of the stern of the acquisition floating vessel.

An arced cable 40 made from synthetic rope 1 inch in diameter, having a length of 350 meters is connected between the port side tow line 30 and the starboard side tow line 31.

A wired lead in connection 42 connected between the arced cable 40 and the acquisition floating vessel. The lead in is 250 meters long in this example. The lead in in this wired version is made from high strength steel reinforced cable with a diameter of 1 inch configured to carry data and electrical power.

24 seismic streamers for towing below 10 meters of water as an array of seismic streamers electrically connect to the lead in connection and mechanically connected to the arced cable.

The array of seismic streamers has a center that is the geometric center of the array, in this example, halfway between seismic streamers 12 and 13 as the array of seismic streamers are towed by the acquisition floating vessel.

24 watertight junction boxes mechanically connected to the arced cable 40.

Each seismic streamer is electrically and mechanically connected to one of the watertight junction boxes.

A plurality of interconnect cables are used. Each of the interconnect cable connects together pairs of watertight junction boxes and can be up 15 meters long.

An interconnect cables electronically connects the connected watertight junction boxes to the lead in connection.

Each of the 24 streamers has 48 receivers.

A first independent energy source floating vessel is located within a preset radius that is no larger than 1000 meters from the center of the array of seismic streamers.

The first independent energy source floating vessel can be 100 foot long platform supply vessel moving in substantially parallel direction of travel using the same magnetic compass bearing as the acquisition floating vessel, such as 90 degrees from magnetic north.

One energy source is being towed by the first independent energy source floating vessel.

The energy source is an array of airguns that provide energy pulses with a frequency ranging from 2 Hz to 1000 Hz during use.

A second independent energy source floating vessel is located within a preset radius that is no larger than 1000 meters from the center of the array of seismic streamers.

The second independent energy source floating vessel can be 200 foot long seismic research vessel moving in substantially parallel direction of travel using the same magnetic compass bearing as the acquisition floating vessel, such as 90 degrees from magnetic north.

One energy source is being towed by the second independent energy source floating vessel.

The energy source is an array of airguns that provide energy pulses with a frequency ranging from 2 Hz to 1000 Hz during use.

The energy pulses 53 from both independent energy source floating vessels enable the acquisition floating vessel 20 to receive a plurality of reflected energy pulses 54 using the plurality of seismic streamers.

The reflected energy pulses have the same frequency as the airguns.

A client device such as a computer with a processor and bidirectional communication with a network receives the reflected energy pulses.

The computer then maps the reflected energy pulses to a subsurface geographic location using a seismic velocity model stored in the non-transitory computer readable media of the computer to migrate reflected energy pulses and produce a high resolution a seismic image.

Example Three

A marine seismic surveying flotilla 10 having an acquisition floating vessel 20 that is a 60 foot long research vessel.

A port side tow line 30 made from high-strength steel wire rope with a ½ inch diameter connected to a port side 22 of a hull of the acquisition floating vessel.

A starboard side tow line 31 made from high-strength steel wire rope with a ½ inch diameter connected to a starboard side 24 of the hull of the acquisition floating vessel.

An arced cable 40 made from synthetic rope ¾ inch in diameter, having a length of 100 meters is connected between the port side tow line 30 and the starboard side tow line 31.

A wired lead in connection 42 connected between the arced cable 40 and the acquisition floating vessel. The lead in is 90 meters long in this example. The lead in in this wired version is made from synthetic fiber reinforced cable with a diameter of ¾ inch configured to carry data and electrical power.

12 seismic streamers for towing below 1 meter of water as an array of seismic streamers electrically connect to the lead in connection and mechanically connected to the arced cable.

The array of seismic streamers has a center that is the geometric center of the array, in this example, halfway between seismic streamers 6 and 7 as the array of seismic streamers are towed by the acquisition floating vessel.

12 watertight junction boxes mechanically connected to the arced cable 40.

Each seismic streamer is electrically connected to one of the watertight junction boxes and mechanically connected to the arced cable with fasteners.

A plurality of interconnect cables are used. Each of the interconnect cable connects together pairs of watertight junction boxes and can be up 9 meters long.

An interconnect cable electronically connects the connected watertight junction boxes to the lead in connection.

Each of the 12 streamers has 8 receivers.

One energy source is being towed by the acquisition floating vessel.

That energy source is a boomer that provides energy pulses with a frequency ranging from 1000 Hz to 5000 Hz during use.

A first independent energy source floating vessel is located within a preset radius that is no larger than 500 meters from the center of the array of seismic streamers.

The first independent energy source floating vessel can be 25 foot long unmanned surface vehicle, such as the C-Worker 8 manufactured by ASV Global of Portchester, United Kingdom, moving in substantially parallel direction of travel using the same magnetic compass bearing as the acquisition floating vessel, such as 270 degrees from magnetic north.

One energy source is attached to the first independent energy source floating vessel.

The energy source is a boomer that provides energy pulses with a frequency ranging from 1000 Hz to 5000 Hz during use.

A second independent energy source floating vessel is located within a preset radius that is no larger than 500 meters from the center of the array of seismic streamers.

The second independent energy source floating vessel can be 25 foot long unmanned surface vehicle, such as the C-Worker 8 manufactured by ASV Global of Portchester, United Kingdom, moving in substantially parallel direction of travel using the same magnetic compass bearing as the acquisition floating vessel, such as 270 degrees from magnetic north.

One energy source is attached to the second independent energy source floating vessel.

The energy source is a boomer that provides energy pulses with a frequency ranging from 1000 Hz to 5000 Hz during use.

The energy pulses 53 from both independent energy source floating vessels enable the acquisition floating vessel 20 to receive a plurality of reflected energy pulses 54 using the plurality of seismic streamers.

The reflected energy pulses have the same frequency as the energy pulses emitted by the boomer energy sources.

A client device such as a computer with a processor and bidirectional communication with a network receives the reflected energy pulses.

The computer then maps the reflected energy pulses to a subsurface geographic location using a seismic velocity model stored in the non-transitory computer readable media of the computer to migrate reflected energy pulses and produce a high resolution a seismic image.

First Example of the Method

A method for producing a high resolution seismic survey with a marine seismic surveying flotilla involves first deploying an array of seismic streamers from behind a tow vessel, such as a 200 foot long platform supply vessel.

The array of seismic streamers can be deployed to a 3 meter water depth for seismic surveying a subsurface geographic location beneath a column of water 3000 meters deep.

An oil platform is positioned in the column of water, and is an obstruction. The seismic survey must obtain reflected data from beneath the obstruction.

An acquisition floating vessel tows the deployed array of seismic streamers behind an acquisition floating vessel using an arced cable and a lead in connection In this example, 18 seismic streamers can be used which are 100 meters each, each streamer having 16 receivers.

In this method, one independent energy source floating vessel is used. The independent energy source floating vessel may be a 250 foot long platform supply vessel.

In this example, the independent energy source floating vessel tows the energy source at a water depth of 4 meters.

In this example of the method, the energy sources can be an array of airguns such as those made by Teledyne Bolt of Houston, Tex.

The independent energy source floating vessel simultaneously (i) has an independent energy source, (ii) maintains constantly a geolocation for within a preset radius to a center of the array of seismic streamers, and (iii) moves substantially in parallel with the acquisition floating vessel.

The frequency range for the energy source pulses are 2 Hz to 1000 Hz and all the numbers in between.

The preset radius for this example is 2500 meters.

The acquisition floating vessel can be heading 237 degrees from magnetic north and the independent energy source floating vessel can use the same heading.

Using the independent energy source floating vessel and the acquisition floating vessel, a subsurface geographic location is traversed, wherein the subsurface geographic location can have a size of 5 kilometers long by 5 kilometers wide.

Energy pulses at preset intervals and at preset frequencies are emitted by the independent energy source floating vessel on a first side of the obstruction.

The floating acquisition vessel is located on a second side of the obstruction.

The offset of the two vessels enables reflected energy pulse acquisition from under the obstruction by the array of seismic streamers of the acquisition floating vessel.

A client device 13, that can be a server with a processor 60 and bidirectional communication with a network 108 located on the acquisition floating vessel is used to not only receive the reflected energy pulses from the array of seismic streamers and to simultaneously map the reflected energy pulses to the subsurface geographic location 110 using a seismic velocity model 112 and migrate reflected energy pulses 54 acquired by the plurality of receivers producing a high resolution a seismic image 128 with a preset bin size and preset sampling interval.

While these embodiments have been described with emphasis on the embodiments, it should be understood that within the scope of the appended claims, the embodiments might be practiced other than as specifically described herein.

Second Example of the Method

A method for producing a high resolution seismic survey with a marine seismic surveying flotilla involves first deploying an array of seismic streamers from behind a tow vessel, such as a 250 foot long seismic research vessel.

The array of seismic streamers can be deployed to a 4 meter water depth for seismic surveying a subsurface geographic location beneath a column of water 1000 meters deep.

An increased rate of production of seismic data acquisition is required to meet a client's timeline. In this example, multiple independent energy source floating vessels are used to achieve a wider swath of data coverage for each distance traveled by the acquisition floating vessel.

An acquisition floating vessel tows the deployed array of seismic streamers behind an acquisition floating vessel using an arced cable and a lead in connection.

In this example, 24 seismic streamers can be used which are 150 meters each, each streamer having 48 receivers.

In this method, two independent energy source floating vessels are used. Both independent energy source floating vessels may be 100 foot long platform supply vessels.

In this example, the independent energy source floating vessel tows the energy source at a water depth of 0.5 meters. The acquisition floating vessel is also towing an energy source at a water depth of 0.5 meters. All three energy sources can be identical sources.

In this example of the method, the energy sources can be bubble guns.

Each independent energy source floating vessel simultaneously (i) has an independent energy source, (ii) maintains constantly a geolocation for within a preset radius to a center of the array of seismic streamers, and (iii) moves substantially in parallel with the acquisition floating vessel.

The frequency range for the energy source pulses are 20 Hz to 1700 Hz and all the numbers in between.

The preset radius for this example is 500 meters.

The acquisition floating vessel can be heading 355 degrees from magnetic north and each independent energy source floating vessel can use the same heading.

Using the independent energy source floating vessels and the acquisition floating vessel, a subsurface geographic location is traversed, wherein the subsurface geographic location can have a size of 25 kilometers long by 25 kilometers wide.

Energy pulses at preset intervals and at preset frequencies are emitted by the energy sources of the acquisition floating vessel and both independent energy source floating vessels.

The floating acquisition vessel is located along a survey line.

The first independent energy source floating vessel is located to the starboard side of the floating acquisition vessel.

The second independent energy source floating vessel is located to the port side of the floating acquisition vessel.

The offsets between the acquisition floating vessel and each independent energy source floating vessel enables acquisition of reflected energy pulses from a continuous swath, which is up to three time wider than the swath acquired by the reflected energy from the energy source on the acquisition floating vessel when operating alone.

A client device 13, that can be a server with a processor 60 and bidirectional communication with a network 108 located on the acquisition floating vessel is used to not only receive the reflected energy pulses from the array of seismic streamers and to simultaneously map the reflected energy pulses to the subsurface geographic location 110 using a seismic velocity model 112 and migrate reflected energy pulses 54 acquired by the plurality of receivers producing a high resolution a seismic image 128 with a preset bin size and preset sampling interval.

While these embodiments have been described with emphasis on the embodiments, it should be understood that within the scope of the appended claims, the embodiments might be practiced other than as specifically described herein.

Third Example of the Method

A method for producing a high resolution seismic survey with a marine seismic surveying flotilla involves first deploying an array of seismic streamers from behind a tow vessel, such as a 120 foot long research vessel.

The array of seismic streamers can be deployed to a 2 meter water depth for seismic surveying a subsurface geographic location beneath a column of water 10 meters deep.

In order to meet a client's geophysical demands, additional data are required using longer offsets between energy sources and receivers than can feasible be achieved using a single vessel approach. A flotilla of vessels will be used to achieve the longer offset requirements.

An acquisition floating vessel tows the deployed array of seismic streamers behind an acquisition floating vessel using an arced cable and a lead in connection In this example, 14 seismic streamers can be used which are 25 meters each, each streamer having 8 receivers.

In this method, two independent energy source floating vessels are used. The first independent energy source floating vessel may be a 25 foot long unmanned surface vehicle, such as the C-Worker 8 manufactured by ASV Global of Portchester, United Kingdom. The second floating vessel may be a 60 foot long research vessel.

In this example, the first independent energy source floating vessel has a bubble gun energy source attached to it at a water depth of 0.5 meters. The second independent energy source vessel is towing an array of airguns energy source at a water depth of 2 meters. The acquisition floating vessel is also towing an array of airguns energy source at a water depth of 2 meters.

Each independent energy source floating vessel simultaneously (i) has an independent energy source, (ii) maintains constantly a geolocation for within a preset radius to a center of the array of seismic streamers, and (iii) moves substantially in parallel with the acquisition floating vessel.

The frequency range for the energy source pulses are 2 Hz to 1700 Hz and all the numbers in between.

The preset radius for this example is 3000 meters.

The acquisition floating vessel can be heading 35 degrees from magnetic north and each independent energy source floating vessel can use the same heading.

Using the independent energy source floating vessels and the acquisition floating vessels, a subsurface geographic location is traversed, wherein the subsurface geographic location can have a size of 10 kilometers long by 5 kilometers wide.

Energy pulses at preset intervals and at preset frequencies are emitted by the energy sources of the acquisition floating vessel and both independent energy source floating vessels.

The floating acquisition vessel is located along a survey line.

The first independent energy source floating vessel is located forward of the floating acquisition vessel along the same survey line.

The second independent energy source floating vessel is located aft of the floating acquisition vessel along the same survey line.

The offsets between the acquisition floating vessel and each independent energy source floating vessel enables acquisition of reflected energy pulses from two distinct offsets, which are greater than the offsets acquired by the reflected energy from the energy source towed by the acquisition floating vessel when operating alone.

A client device 13, that can be a server with a processor 60 and bidirectional communication with a network 108 located on the acquisition floating vessel is used to not only receive the reflected energy pulses from the array of seismic streamers and to simultaneously map the reflected energy pulses to the subsurface geographic location 110 using a seismic velocity model 112 and migrate reflected energy pulses 54 acquired by the plurality of receivers producing a high resolution a seismic image 128 with a preset bin size and preset sampling interval.

In an embodiment, the marine seismic surveying flotilla uses fewer lead in connections than the plurality of seismic streamers by an integer from 1 to 23.

In an embodiment, the ratio of number of lead in connections to seismic streamers can be 1:3.

In an embodiment, the ratio of number of lead in connections to seismic streamers can be 1:5.

In another embodiment, the ratio of number of lead in connections to seismic streamers can be 1:15.

While these embodiments have been described with emphasis on the embodiments, it should be understood that within the scope of the appended claims, the embodiments might be practiced other than as specifically described herein.

What is claimed is:

1. A marine seismic surveying flotilla comprising:
   a. an acquisition floating vessel;
   b. a port side tow line connected to either a port side of a hull of the acquisition floating vessel or a port portion of a stem of the acquisition floating vessel;
   c. a starboard side tow line connected to either a starboard side of the hull of the acquisition floating vessel or a starboard portion of the stern of the acquisition floating vessel;
   d. a continuous arced cable connected between the port side tow line and the starboard side tow line, transmitting power and communication signals;
   e. a plurality of seismic streamers for towing below a surface of water as an array of seismic streamers that electrically connects to at least one lead in connection and mechanically connects to the arced cable, the array of seismic streamers having a center;
   f. at least one lead in connection connected between the arced cable and the acquisition floating vessel, wherein there are fewer lead in connections than the plurality of seismic streamers;
   g. a plurality of watertight junction boxes providing a mechanical connection an electrical connection and communication signals to the arced cable, each seismic streamer of the plurality of seismic streamers electrically connected to one watertight junction box of the plurality of watertight junction boxes;
   h. a plurality of interconnect cables, wherein one interconnect cable of the plurality of interconnect cables connects together pairs of watertight junction boxes of the plurality of watertight junction boxes and one of the interconnect cables of the plurality of interconnect cables electronically connects the connected plurality of watertight junction boxes to the at least one lead in connection;
   i. a plurality of receivers, with at least one receiver of the plurality of receivers positioned on each of the plurality of seismic streamers;
   j. at least one independent energy source floating vessel, each independent energy source floating vessel located within a preset radius from the center of the array of seismic streamers, wherein the preset radius is from 10 meters to 5000 meters from the center of the array of seismic streamers, each independent energy source floating vessel moving in substantially parallel direction of travel with the acquisition floating vessel;
   k. a plurality of energy sources providing energy pulses, each independent energy source floating vessel having at least one energy source of the plurality of energy sources, and wherein the energy pulses enable the plurality of receivers of the acquisition floating vessel to receive a plurality of reflected energy pulses using the plurality of seismic streamers; and
   l. a client device with a processor, a display and bidirectional communication with a network, receives the reflected energy pulses, maps the reflected energy pulses to a subsurface geographic location using a seismic velocity model to migrate reflected energy pulses acquired by the plurality of receivers to produce a high resolution seismic image with a preset bin size and preset sampling interval.

2. The marine seismic surveying flotilla of claim 1, comprising a port side diverter connected to the port side tow line and a starboard side diverter connected to the starboard side tow line, wherein the arced cable is connected between the port side diverter and the starboard side diverter.

3. The marine seismic surveying flotilla of claim 1, wherein the reflected energy pulses are used to obtain a high resolution seismic image from beneath an obstruction either (i) on the sea floor, (ii) beneath the sea floor; (iii) proximate the sea floor, or (iv) proximate the sea surface which is slightly below the sea surface to above the sea surface.

4. The marine seismic surveying flotilla of claim 1, further comprising from 2 receivers to 128 receivers positioned on each of the plurality of seismic streamers.

5. The marine seismic surveying flotilla of claim 1, wherein each seismic streamer of the plurality of seismic streamers has a length from 12 to 400 meters.

6. The marine seismic surveying flotilla of claim 1, wherein each seismic streamer comprises at least one of: a head stretch section, a tail stretch section, an acoustic buoy, a global positioning system buoy, and a tail buoy, connected in a portion of the plurality of seismic streamers, wherein the head stretch section engages the arced cable or one of the watertight junction boxes.

7. The marine seismic surveying flotilla of claim 1, wherein at least one seismic streamer of the plurality of seismic streamers mechanically and electrically connects to one watertight junction box of the plurality of watertight junction boxes.

8. The marine seismic surveying flotilla of claim 1, wherein at least one seismic streamer of the plurality of seismic streamers mechanically connects to the arced cable while electrically connecting to one of the watertight junction boxes with an electrical streamer jumper.

9. The marine seismic surveying flotilla of claim 1, wherein the plurality of seismic streamers are in a wired connection, a wireless connection, or a combination of wired and wireless connections, to the acquisition floating vessel.

10. The marine seismic surveying flotilla of claim 1, wherein each receiver of the plurality of receivers is integral within a seismic streamer of the plurality of seismic streamers.

11. The marine seismic surveying flotilla of claim 1, wherein each receiver of the plurality of receivers comprises at least one sensor from the group: a pressure sensor, an acceleration sensor, electromagnetic sensor, magnetic sensor, velocity sensor, and combinations thereof.

12. The marine seismic surveying flotilla of claim 1, wherein the acquisition floating vessel has at least one energy source of the plurality of energy sources.

13. The marine seismic surveying flotilla of claim 1, wherein the plurality of watertight junction boxes are each affixed to the arced cable with each interconnect cable of the plurality of interconnect cables connected parallel to the arced cable.

14. The marine seismic surveying flotilla of claim 1, wherein the plurality of watertight junction boxes are each affixed to an arced cable with each interconnect cable of the plurality of interconnect cables wound around the arced cable.

15. The marine seismic surveying flotilla of claim 1, wherein each watertight junction box of the plurality of watertight junction boxes connects to two separate segments of arced cable, and each watertight junction box of the plurality of watertight junction boxes connects between two separate interconnect cables and one of the seismic streamers.

16. The marine seismic surveying flotilla of claim 1, wherein the at least one lead in connection is less than the plurality of seismic streamers by an integer from 1 to 23.

* * * * *